(12) United States Patent
Kanekura

(10) Patent No.: US 6,234,931 B1
(45) Date of Patent: May 22, 2001

(54) DRIVING FORCE TRANSMISSION APPARATUS

(75) Inventor: Kazunori Kanekura, Chikushino (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/260,028

(22) Filed: Mar. 2, 1999

(30) Foreign Application Priority Data

Mar. 9, 1998 (JP) .................................. 10-056364

(51) Int. Cl.⁷ .................................................. F16H 3/70
(52) U.S. Cl. ......................... 475/149; 475/169; 475/269
(58) Field of Search .................................. 475/169, 171, 475/174, 175, 178, 269, 149, 151; 192/84.92, 84.93

(56) References Cited

U.S. PATENT DOCUMENTS

| | | | |
|---|---|---|---|
| 2,480,210 | * 8/1949 | Avila | 475/169 |
| 2,533,056 | * 12/1950 | Selby | 475/149 |
| 3,430,521 | * 3/1969 | Kulman | 475/269 |
| 4,270,411 | * 6/1981 | Pengo et al. | 475/269 |
| 4,286,480 | * 9/1981 | Dickie | 475/269 |
| 4,440,042 | * 4/1984 | Holdeman | 475/269 |
| 4,878,399 | * 11/1989 | Kameda | 475/269 |
| 5,045,036 | * 9/1991 | Reuter et al. | 475/149 |
| 5,123,883 | * 6/1992 | Fukaya | 475/178 |

\* cited by examiner

*Primary Examiner*—Sherry Estremsky
(74) *Attorney, Agent, or Firm*—Stevens, Davis, Miller & Mosher, LLP

(57) ABSTRACT

A driving force transmission apparatus achieves a high speed ratio and has a compact and inexpensive structure. The apparatus includes speed change elements including a cam portion, a gear, an internal gear and a correction plate, a connecting arrangement including a second clutch plate, a third clutch plate, an electromagnetic coil and a coil spring, and a first clutch plate, all arranged on a common shaft. This arrangement achieves both a high speed ratio and a compact and inexpensive structure.

4 Claims, 5 Drawing Sheets

DRIVING FORCE TRANSMISSION APPARATUS

BACKGROUND OF THE INVENTION

1. Field of the Invention

The present invention relates to a driving force transmission apparatus used for an image reading apparatus such as an image scanner, a digital copying machine and the like for reading image information on a manuscript.

2. Description of the Related Art

In recent years, due to a high speed and a high resolution in reading an image by an image reading apparatus, in order to achieve both a high speed driving for reading the image at a high speed and a low speed driving for reading the image at a high resolution, a driving force transmission apparatus is required reading at a higher speed ratio. Further, the image reading apparatus has been made compact and inexpensive year by year, so that the driving force transmission apparatus therefor is required to be made compact and inexpensive as well as to be provided with a high speed ratio.

A conventional driving force transmission apparatus will be described below. FIG. 4 is a cross sectional view of an image reading apparatus using a conventional driving force transmission apparatus, FIG. 5 is a perspective view of the image reading apparatus using the conventional driving force transmission apparatus, and FIG. 6 is a perspective view of main construction members in the conventional driving force transmission apparatus.

In FIG. 4, reference numeral 1 denotes a frame body of a main body of an image scanner corresponding to an image reading apparatus, reference numeral 2 denotes a manuscript, reference numeral 3 denotes a manuscript table glass on which the manuscript is placed, reference numeral 4 denotes a manuscript pressing plate for adhering the manuscript 2 to the manuscript table glass 3, reference numeral 5 denotes a fluorescent lamp for lighting the manuscript 2, reference numeral 6 denotes a reflecting mirror, reference numeral 7 denotes a image forming lens for forming a light image, reference numeral 8 denotes a CCD in which some thousands of photo-electric conversion components for converting the light image formed by the image forming lens 7 into an electric signal in accordance with a photo-electric conversion are arranged on a line, and reference numeral 9 denotes an optical carriage corresponding to a moving body obtained by integrally constituting the reflecting mirror 6, the image forming lens 7 and the CCD 8.

In FIG. 5, reference numeral 10 denotes a rail for supporting the optical carriage 9 in such a manner as to move linearly, reference numeral 11 denotes a driving unit, reference numeral 12 denotes a driving pulley, reference numeral 13 denotes a transmission belt rotated by the driving pulley 12, and reference numeral 14 denotes a driven pulley tensioning the transmission belt 13 together with the drive pulley 12.

In FIG. 6, reference numeral 15 denotes a driving motor for generating a rotational force, reference numerals 16 and 17 denote a pulley, reference numeral 18 denotes a transmission belt tensioned between the pulleys 16 and 17, reference numeral 19 denotes a clutch, and reference numeral 20 denotes a shaft connected to the driving pulley 12. A rotation of the pulley 17 can be transmitted to the shaft 20 when the clutch 19 is energized. Reference numerals 21, 22, 23 and 24 denote a pulley, in which the pulley 21 is connected to the pulley 17 and the pulley 24 is connected to the shaft 20, respectively. Reference numerals 25 and 27 denote a transmission belt tensioned between the pulleys 21 and 22 and the pulleys 23 and 24, respectively, reference numeral 28 denotes a clutch, and reference numeral 29 denotes a shaft connected to the pulley 23. A rotation of the pulley 22 can be transmitted to the shaft 29 when the clutch 28 is energized.

With respect to the conventional driving force transmission apparatus structured in the manner mentioned above, an operation thereof will be described below with reference to FIGS. 4 to 6.

In FIGS. 4 and 5, a reflecting light after lighting the manuscript 2 by the fluorescent lamp 5 is reflected by the reflecting mirror 6 so as to form an image on the CCD 8 by the image forming lens 7, so that the image corresponds to a line of the manuscript 2 by the CCD 8. The driving unit 11 rotates the transmission belt 13, and the optical carriage 9 moves in a direction of an arrow A together with the transmission belt 13, whereby all the surface of the manuscript 2 can be read.

In this case, in order to read the manuscript 2, it is necessary to rotate the driving unit 11 at a high speed so as to move the optical carriage 9 at a high speed. Further, since a time for which the CCD 8 reads a line of the manuscript 2 is constant, in order to read the manuscript 2 at a high resolution, it is necessary to rotate the driving unit 11 at a low speed so as to move the optical carriage 9 at a low speed. By doing so, it is possible to read the manuscript 2 at a high density in a moving direction of the optical carriage 9.

Next, in FIG. 6, in the case that the clutch 19 is energized, the rotation of the driving motor 15 is transmitted to the pulley 16, the transmission belt 18, the pulley 17, the shaft 20 and the driving pulley 12, and the rotation of the driving motor 15 is reduced in accordance with a one-step speed reduction by the pulleys 16 and 17. Further, in the case that the clutch 28 is energized, the rotation of the driving motor 15 is transmitted to the pulley 16, the transmission belt 18, the pulley 17, the pulley 21, the transmission belt 25, the pulley 22, the shaft 29, the pulley 23, the transmission belt 26, the pulley 24, the shaft 20 and the driving pulley 12, and the rotation of the driving motor 15 is further reduced in accordance with a three-step speed reduction by the pulleys 16 and 17, the pulleys 21 and 22, and the pulleys 23 and 24.

As mentioned above, a speed ratio higher than a speed ratio of the driving motor 15 itself can be obtained by transmitting the rotation from the driving motor 15 in accordance with two systems of rotational force transmission paths.

However, in order to achieve a high speed ratio, in accordance with the conventional structure mentioned above, there is a problem that the driving unit 11 requires a large size and an expensive cost since a plurality of pulleys, transmission belts and clutches are required, and further, the image forming apparatus is made with an increased size and expense.

SUMMARY OF THE INVENTION

The present invention is directed to solving the problem in the conventional apparatus mentioned above, and an object of the present invention is to provide a driving force transmission apparatus which can achieve both a high speed structure and a compact and inexpensive structure.

In order to achieve the object mentioned above, in accordance with the present invention, there is provided a driving force transmission apparatus which can achieve both a compact size and an inexpensive cost by arranging speed change means and connecting means for selectively transmitting any one of a rotational force from the speed change means and a rotational force not passing through the speed change means in series.

DESCRIPTION OF THE PREFERRED EMBODIMENT

Figure 1A:
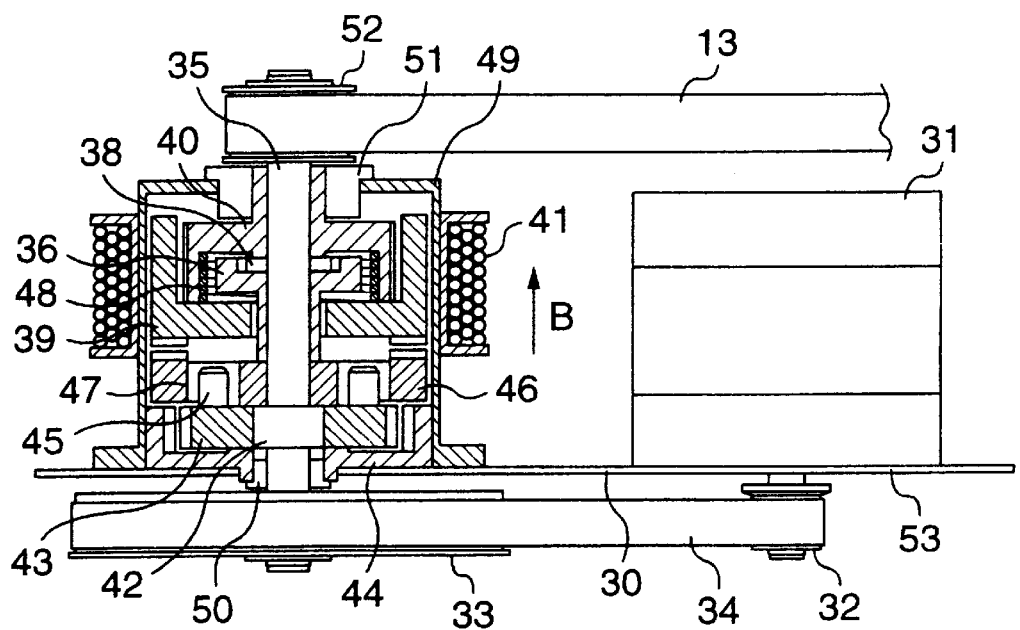
FIG. 1A is a cross sectional view of a driving force transmission apparatus in accordance with an embodiment of the present invention at a time when an electromagnetic coil is energized.
Figure 1B:
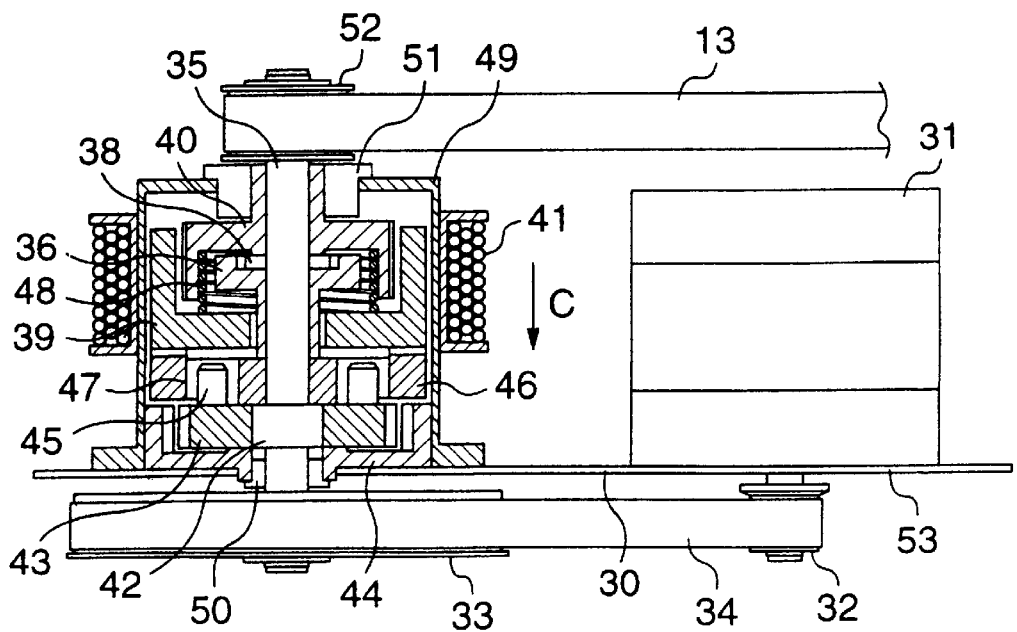
FIG. 1B is a cross sectional view of a driving force transmission apparatus in accordance with an embodiment of the present invention at a time when the electromagnetic coil is not energized.
Figure 2:
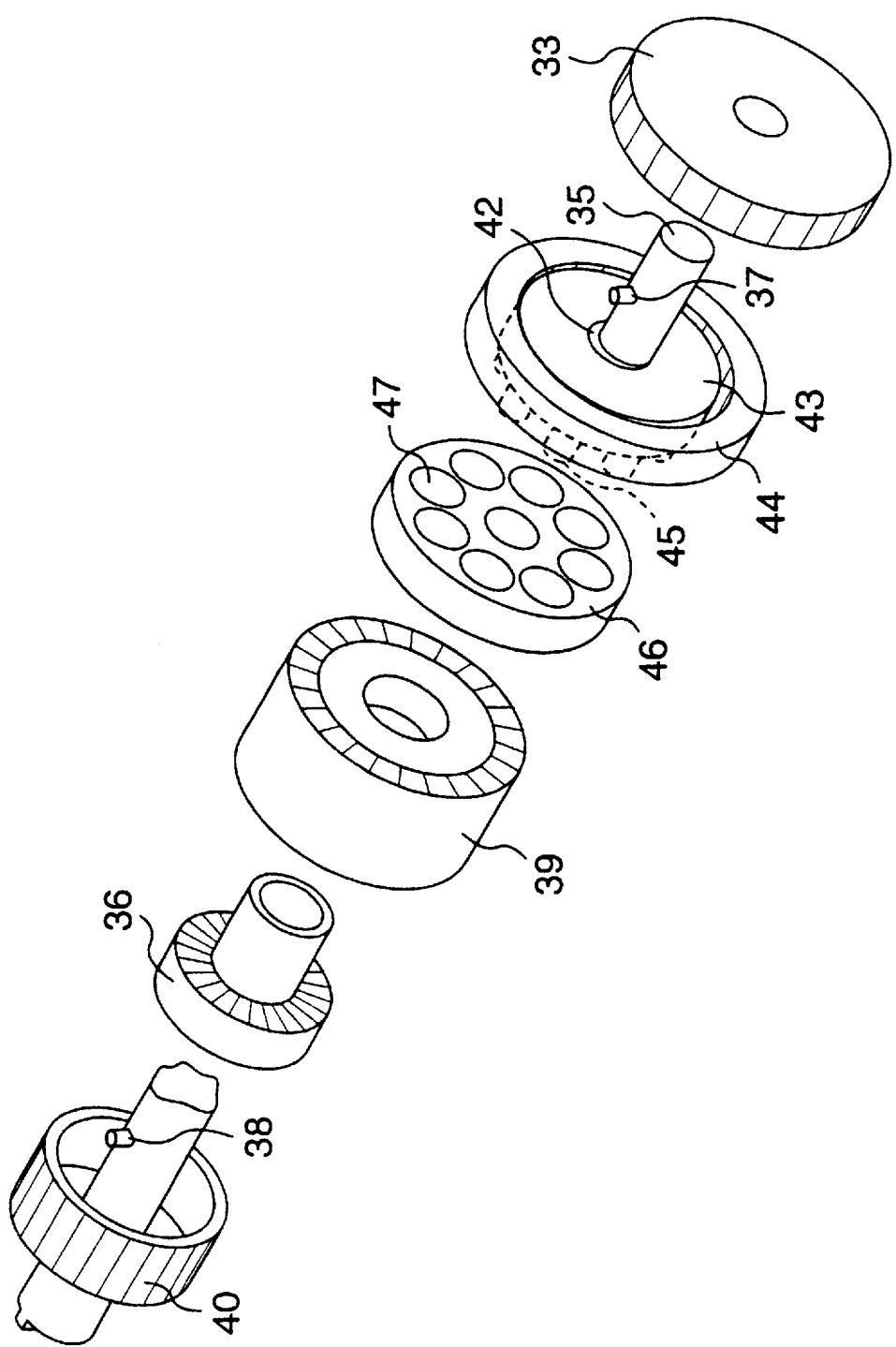
FIG. 2 is a perspective view of main construction members of the driving force transmission apparatus in accordance with the embodiment of the present invention.
Figure 3:
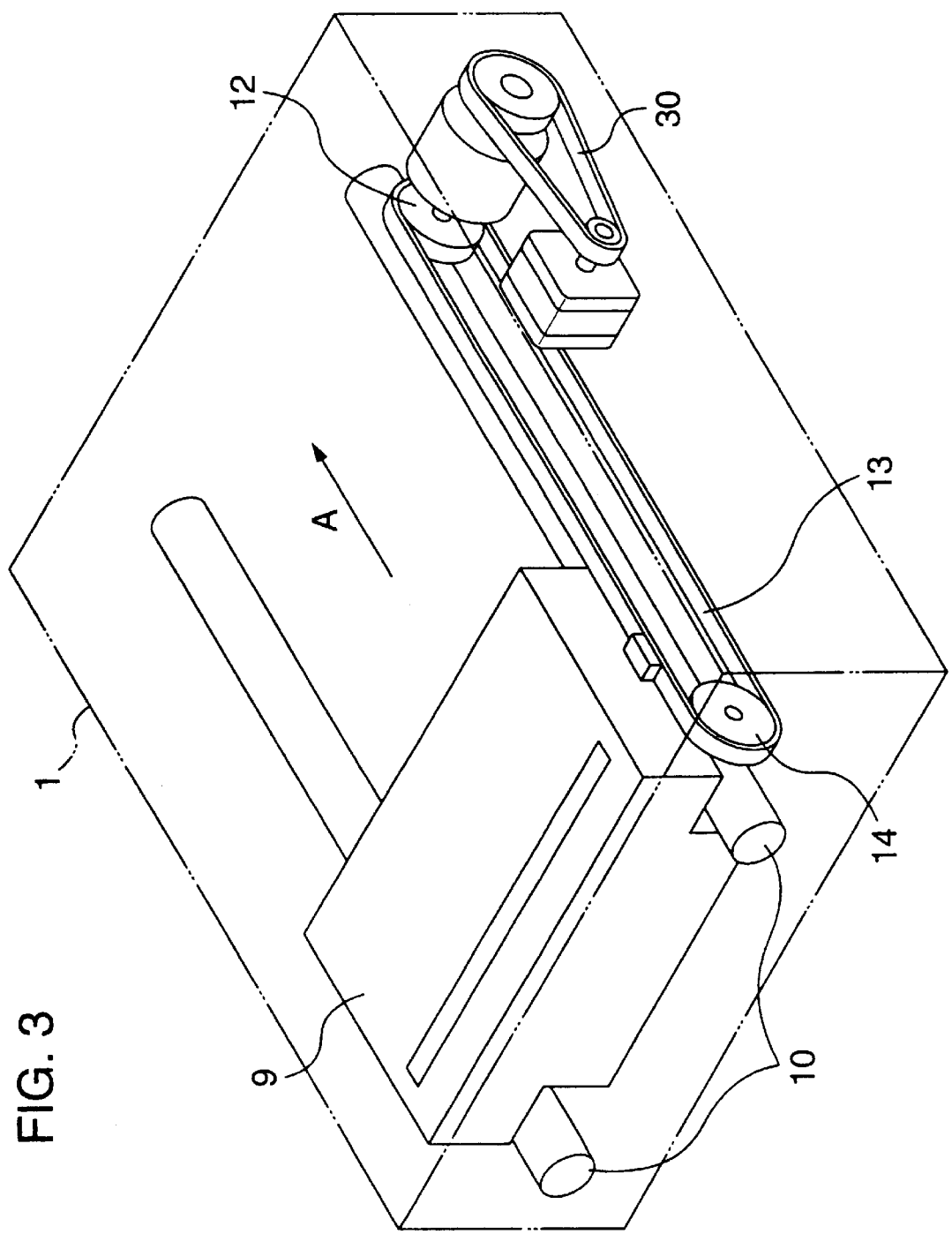
FIG. 3 is a perspective view of an image reading apparatus using the driving force transmission apparatus in accordance with the embodiment of the present invention.
Figure 4:
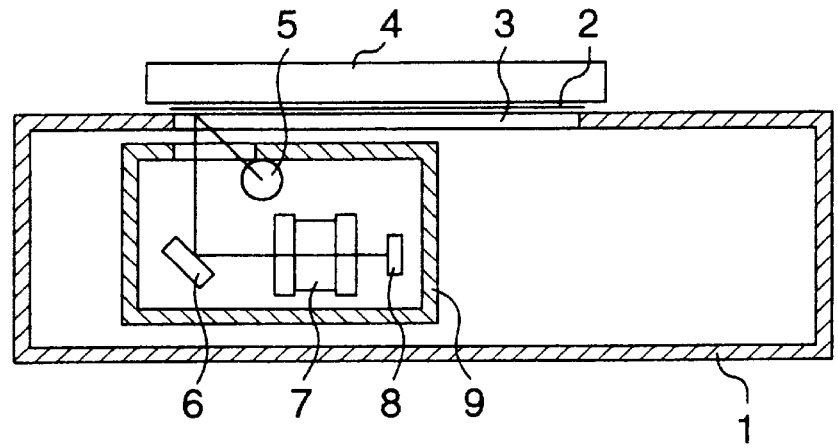
FIG. 4 is a cross sectional view of an image reading apparatus using a conventional driving force transmission apparatus.
Figure 6:
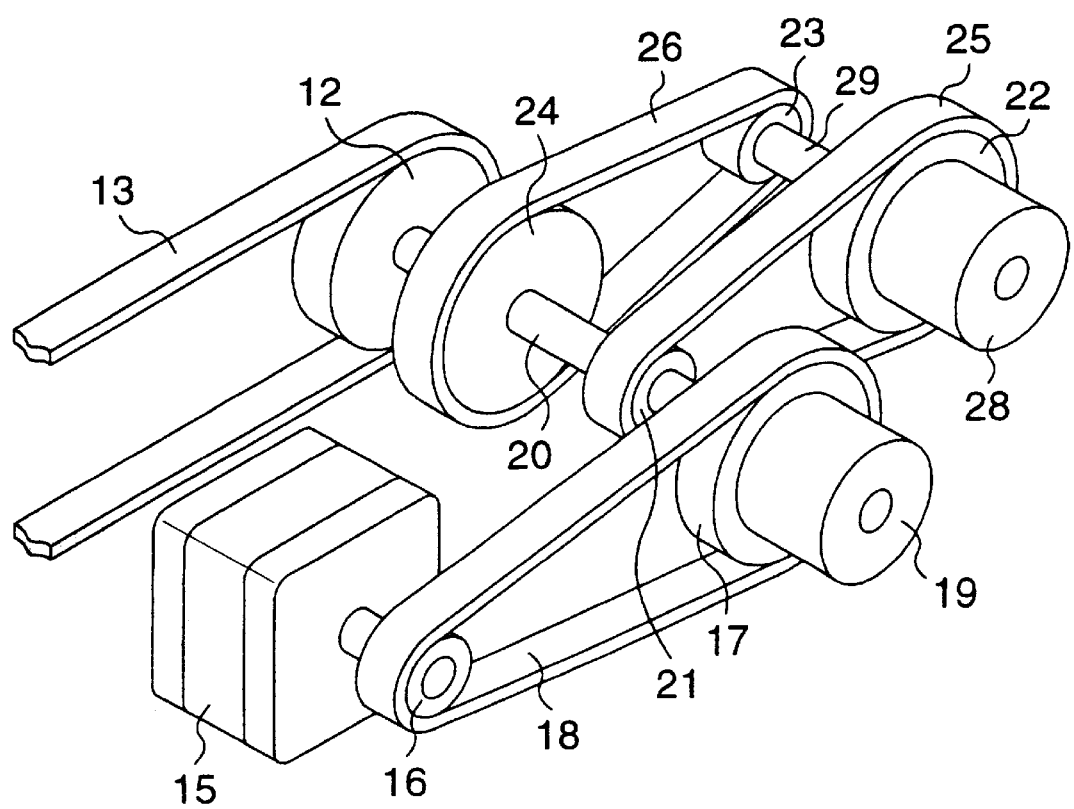
FIG. 6 is a perspective view of main construction members in the conventional driving force transmission apparatus.
Figure 5:
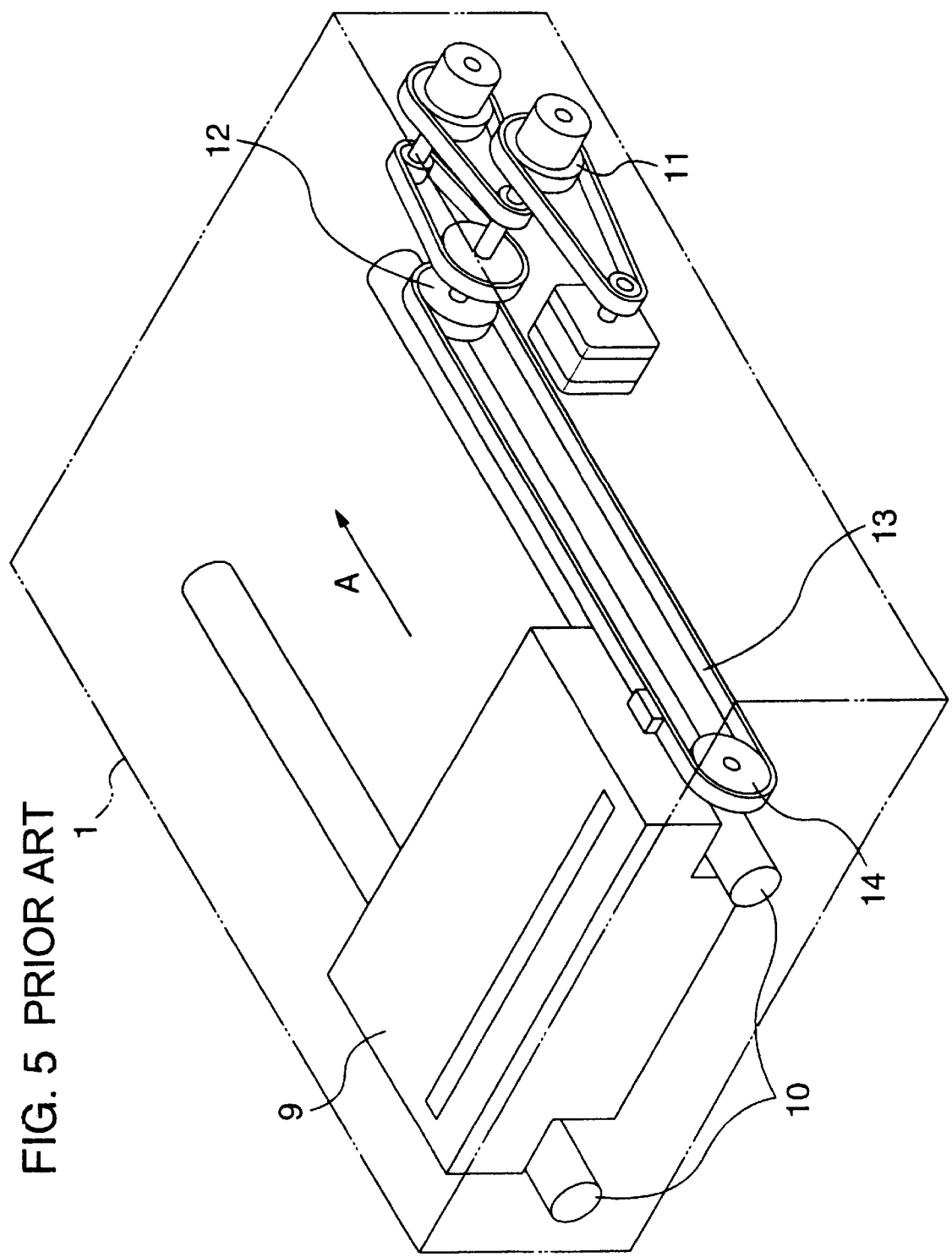
FIG. 5 is a perspective view of the image reading apparatus using the conventional driving force transmission apparatus.

An embodiment in accordance with the present invention will be described below. FIGS. 1A and 1B are cross sectional views of a driving force transmission apparatus in accordance with an embodiment of the present invention, FIG. 2 is a perspective view of main construction members of the driving force transmission apparatus in accordance with the embodiment of the present invention, and FIG. 3 is a perspective view of an image reading apparatus using the driving force transmission apparatus in accordance with the embodiment of the present invention. The same reference numerals are attached to the same elements which are the same as the elements of the structure shown in FIGS. 4 to 6 showing the conventional driving force transmission apparatus, and a detailed description will be omitted.

In FIGS. 1 and 2, reference numeral 30 denotes a driving unit corresponding to a driving force transmission apparatus, reference numeral 31 denotes a driving motor for generating a rotational force, reference numerals 32 and 33 denote a pulley, reference numeral 34 denotes a transmission belt corresponding to rotational force transmission means tensioned between the pulleys 32 and 33, reference numeral 35 denotes a shaft, and reference numeral 36 denotes a first clutch plate corresponding to a connecting portion, in which the pulley 33 and the first clutch plate 36 are connected to the shaft 35 by means of pins 37 and 38. Rotational force input means is constituted by the pulley 33, the shaft 35 and the first clutch plate 36. Reference numeral 39 denotes a second clutch plate and reference numeral 40 denotes a third clutch plate rotatably supported to the shaft 35, in which the second clutch plate 39 is structured such that tooth-shaped portions are meshed with each other with respect to the third clutch plate 40, and is supported so as to move in a direction of arrows B and C with respect to the third clutch plate 40 and to transmit the rotational force.

Further, the second clutch plate 39 is structured such that tooth-shaped portions are meshed with each other with respect to the first clutch 36. Reference numeral 41 denotes an electromagnetic coil, which is energized so as to move the second clutch plate 39 in the direction of the arrow B and mesh with the first clutch plate 36, thereby transmitting the rotational force.

Reference numeral 42 denotes a cam portion integrally formed in the shaft 35 in a shifted manner, reference numeral 43 denotes a gear moving in a planetary manner around the shaft 35 by outwardly contacting the cam portion 42, and reference numeral 44 denotes an internal gear coaxially provided in the shaft 35 and having teeth of some number more than a number of the gear 43, in which the gear 43 moves in a planetary manner while meshing with the internal gear 44. Reference numeral 45 denotes a pin provided in the gear 43, reference numeral 46 denotes a correction plate corresponding to first rotational force output means rotatably supported in the shaft 35, and reference numeral 47 denotes a hole provided in the correction plate 46 and inwardly contacting with the pin 45, which has a diameter a shifting amount of the cam portion 42 larger than that of the pin 45.

Further, the correction plate 46 is structured such that the tooth-shaped portions are meshed with each other with respect to the second clutch plate 39. Speed change means is constituted by the cam portion 42, the gear 43, the internal gear 44 and the correction plate 46.

In this case, when the internal gear 44 rotates at a time, the gear 43 rotates at a degree of a difference between the numbers of the teeth of the gear 43 and the internal gear 44. Since the gear 43 moves in a planetary manner, the motion of the gear 43 is converted into the rotation around the shaft 35 by the correction plate 46. Accordingly, when a number of the teeth of the gear 43 is set to a, a number of the teeth of the internal gear 44 is set to b and a speed reduction ratio is set to r, a high speed change ratio can be obtained by one step as shown in the formula r=(b−a)/a.

Reference numeral 48 denotes a coil spring. Since the coil spring 48 urges the second clutch plate 39 in a direction of an arrow C in the case that the electromagnetic coil 41 is not energized, the second clutch plate 39 is removed from an engagement with respect to the third clutch plate 40 and engaged with the correction plate 46, so that the rotational force can be transmitted. Connecting means is constituted by the second clutch plate 39, the third clutch plate 40, the electromagnetic coil 41 and the coil spring 48.

Reference numeral 49 denotes a cylindrical cover. A frame body is constituted by the internal gear 44 and the cover 49, and rotatably supports the shaft 35 through a bearing 50, and further, rotatably supports the third clutch plate 40 through a bearing 51.

Reference numeral 52 denotes a driving pulley corresponding to second rotation output means. The driving pulley 52 is rotatably supported to the shaft 35 and fitted with the third clutch plate 40 in an uneven portion, so that the rotational force can be transmitted.

Reference numeral 53 denotes a metal plate, which supports the driving motor 31 and the driving force transmission apparatus in parallel and is fixed to the frame 1 (FIG. 3).

With respect to the driving force transmission apparatus structured in the manner mentioned above, an operation thereof will be described below with reference to FIGS. 1 and 3.

At first, in FIG. 1A, since the second clutch 39 moves in the direction of the arrow B when the electromagnetic coil 41 is energized, the second clutch 39 is removed from the correction plate 46 so as to be connected to the first clutch plate 36. Accordingly, the rotational force of the driving motor 31 is transmitted to the pulley 32, the transmission belt 34, the pulley 33, the shaft 35, the first clutch plate 36, the second clutch plate 39, the third clutch plate 40 and the driving pulley 52, so that the speed is reduced in accordance with a one step speed reduction step by the pulleys 32 and 33.

Further, in FIG. 1B, when the electromagnetic coil 41 is not energized, the second clutch plate 39 moves in the direction of the arrow C by the coil spring 48, is removed from the first clutch 36, and is connected to the correction plate 46. Accordingly, the rotational force of the driving motor 31 is transmitted to the pulley 32, the transmission belt 34, the pulley 33, the shaft 35, the gear 43, the correction plate 46, the second clutch plate 39, the third clutch plate 40 and the driving pulley 52, so that the speed is further reduced in accordance with the speed reduction by the pulleys 32 and 33, and the speed change means comprising the cam portion 42, the gear 43, the internal gear 44 and the correction plate 46, in comparison with the speed reduction at a time when the electromagnetic coil 41 is energized.

As mentioned above, in accordance with the present invention, a simple structure can be obtained by coaxially constructing all the constructing elements having the speed change means comprising the cam portion 42, the gear 43, the internal gear 44 and the correction plate 46, the connecting means comprising the second clutch plate 39, the third clutch plate 40, the electromagnetic coil 41 and the coil spring 48, and the first clutch 36 on the shaft 35, so that both a high speed ratio and a compact and inexpensive structure can be achieved.

Further, it is possible to unitize by surrounding by means of the frame body comprising the internal gear 44 and the cover 49, so that an assembly operation can be improved and an inexpensive structure can be realized.

What is claimed is:

1. A driving force apparatus comprising:

a rotatable shaft supported by a first bearing near one end portion and supported by a second bearing near another end portion;

a first clutch plate fixed to said shaft and rotating together with said shaft;

rotational force input means mounted to one end portion of said shaft;

rotational force output means provided in another end portion of said shaft so as to be coaxial with said shaft and freely rotate with respect to said shaft;

a second clutch plate provided on said shaft for rotating with respect to said shaft and moving longitudinally along said shaft;

a third clutch plate connected to said second clutch plate, for rotating with respect to said shaft, and engaged with said rotational force output means; and electromagnetic means for moving said second clutch plate longitudinally along said shaft so as to engage with said first clutch plate;

speed change means for engaging with said second clutch plate in a case that said second clutch plate is disengaged from said first clutch plate and fixed to said shaft, wherein said first clutch plate, said second clutch plate, said third clutch plate, said electromagnetic means and said speed change means are all arranged on said shaft between said first bearing and said second bearing.

2. A driving force transmission apparatus as claimed in claim 1, further comprising Pins for fixing said first clutch plate to said shaft, and wherein said first clutch Plate is arranged on said shaft between said second clutch plate and said third clutch plate.

3. A driving force transmission apparatus as claims in claim 1, further comprising a frame body surrounding said speed change means and said second clutch plate, said third clutch plate and said electromagnetic means.

4. A driving force transmission apparatus as claimed in claim 1, wherein said electromagnetic means comprises an electromagnetic coil.

\* \* \* \* \*

UNITED STATES PATENT AND TRADEMARK OFFICE
CERTIFICATE OF CORRECTION

PATENT NO.   : 6,234,931 B1
DATED        : May 22, 2001
INVENTOR(S)  : Kanekura

It is certified that error appears in the above-identified patent and that said Letters Patent is hereby corrected as shown below:

<u>Title page,</u>
Item [*], Notice, please correct to include the following: -- [*] Notice: This Patent issued on a continued prosecution application filed under 37 CFR 1.53(d), and is subject to the twenty year patent term provisions of 35 U.S.C. 1.54(a)(2). --

Signed and Sealed this

Twenty-fourth Day of September, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.    : 6,234,931 B1
DATED         : May 22, 2001
INVENTOR(S)   : Kanekura It is certified that error appears in the above-identified patent and that said Letters Patent is hereby corrected as shown below:

<u>Title page,</u>
Item [\*], Notice, please correct to include the following: -- [\*] Notice: This Patent issued on a continued prosecution application filed under 37 CFR 1.53(d), and is subject to the twenty year patent term provisions of 35 U.S.C. 1.54(a)(2). --

Signed and Sealed this

Fifteenth Day of October, 2002

*Attest:*

*Attesting Officer*

JAMES E. ROGAN
*Director of the United States Patent and Trademark Office*